United States Patent [19]
Coutant et al.

[11] Patent Number: 5,561,979
[45] Date of Patent: Oct. 8, 1996

[54] CONTROL ARRANGEMENT FOR A HYDROSTATIC SYSTEM

[75] Inventors: Alan R. Coutant, Chillicothe; Jerry D. Marr, Metamora, both of Ill.

[73] Assignee: Caterpillar Inc., Peoria, Ill.

[21] Appl. No.: 390,001

[22] Filed: Feb. 17, 1995

[51] Int. Cl.$^6$ ..................................... F16D 31/02
[52] U.S. Cl. ................. 60/448; 60/490; 60/491
[58] Field of Search ........................... 60/328, 368, 444, 60/448, 488, 490, 491

[56] References Cited

U.S. PATENT DOCUMENTS

| | | | |
|---|---|---|---|
| 4,116,002 | 9/1978 | Knapp et al. | 60/488 |
| 4,282,711 | 8/1981 | Branstetter | 60/490 |
| 5,121,603 | 6/1992 | Widemann | 60/447 |
| 5,193,416 | 3/1993 | Kanayama | 60/490 |
| 5,203,168 | 4/1993 | Oshina et al. | 60/426 |

FOREIGN PATENT DOCUMENTS

| | | | |
|---|---|---|---|
| 184748 | 11/1982 | Japan | 60/444 |

*Primary Examiner*—F. Daniel Lopez
*Attorney, Agent, or Firm*—J. W. Burrows

[57] ABSTRACT

In many hydrostatic systems, the variable displacement pump is controlled by an operator moving a directional control valve to provide pressurized fluid to the displacement changing mechanism thereof which in turn varies the displacement responsive to the degree of pressurized fluid being directed to the displacement changing mechanism. In order to insure that the displacement of the Variable displacement pump is at the desired displacement, various forms of follow-up mechanisms have been required. These follow-up mechanisms are many times complicated and expensive to add to the hydrostatic system. In the subject arrangement, the speed of the pump input shaft and the speed of the motor output shaft is sensed (R,S) and the signals directed to a microprocessor which in turn processes the signals and directs a control signal (P) to a solenoid operated proportional valve. The solenoid operated proportional valve moves in response to the control signal and directs pressurized fluid to the displacement controller of the variable displacement pump to change the displacement thereof. Once the speed of the output shaft is achieved, the microprocessor modifies the control signal to maintain the variable displacement pump at the needed displacement position to maintain the desired speed of the output shaft to a work system. This arrangement provides an accurate control of the displacement of the variable displacement pump without the need of providing complicated follow-up mechanisms and/or servo mechanisms.

5 Claims, 2 Drawing Sheets

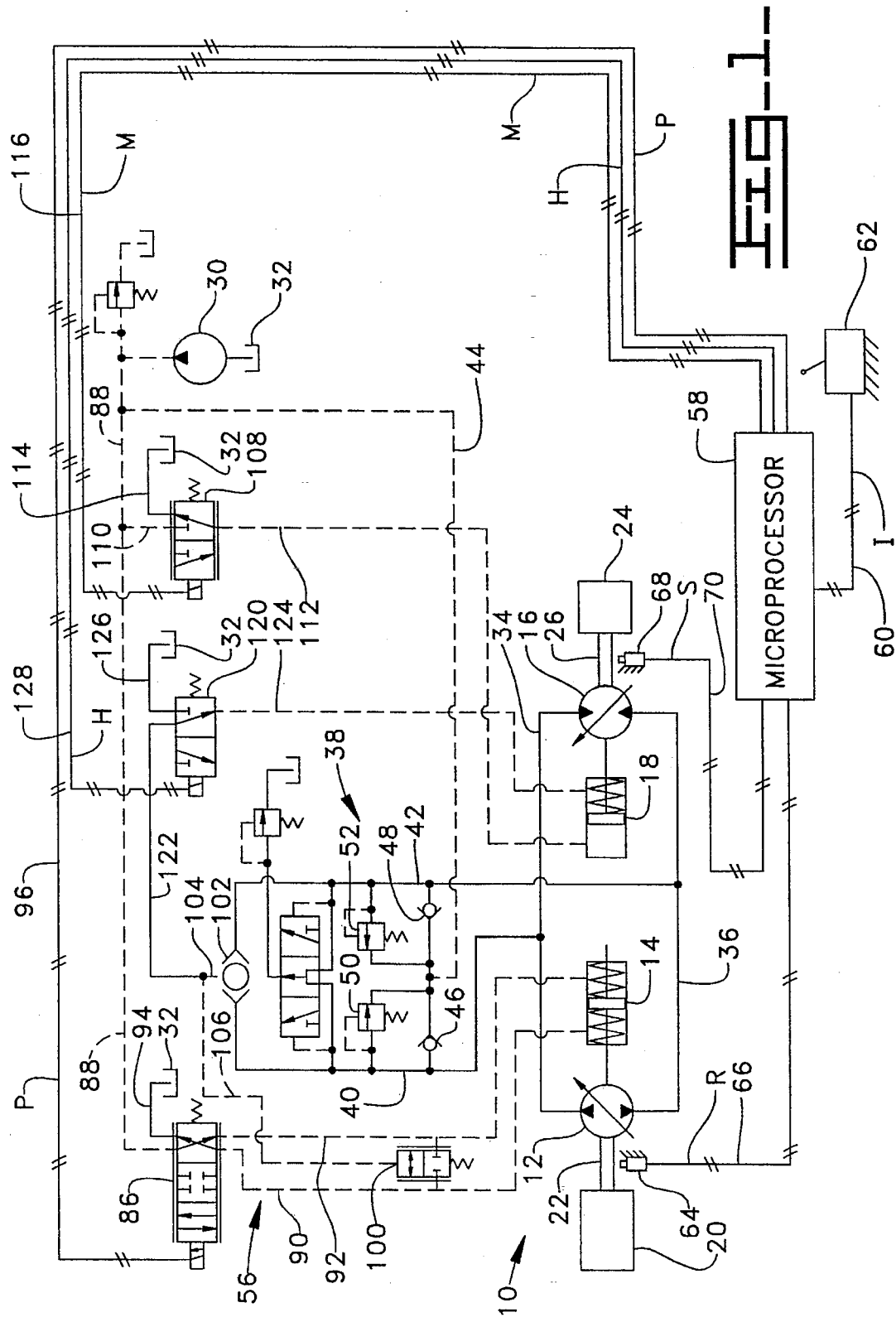

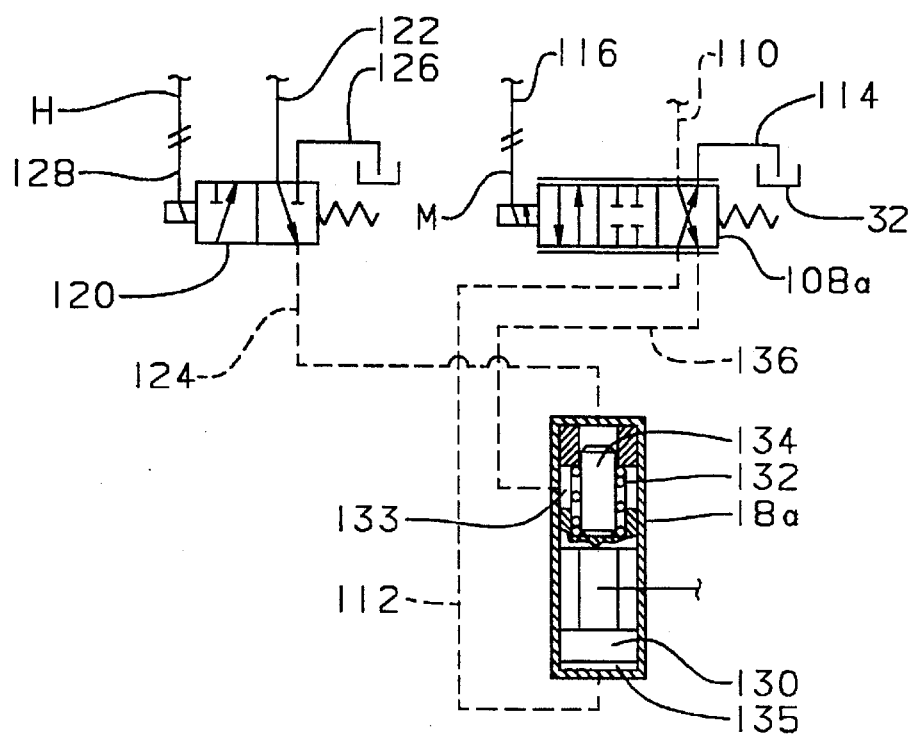
Fig_2_
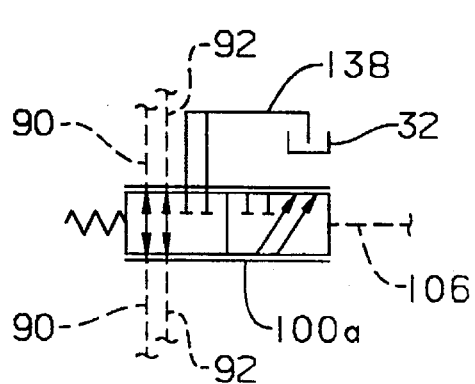
Fig_3_
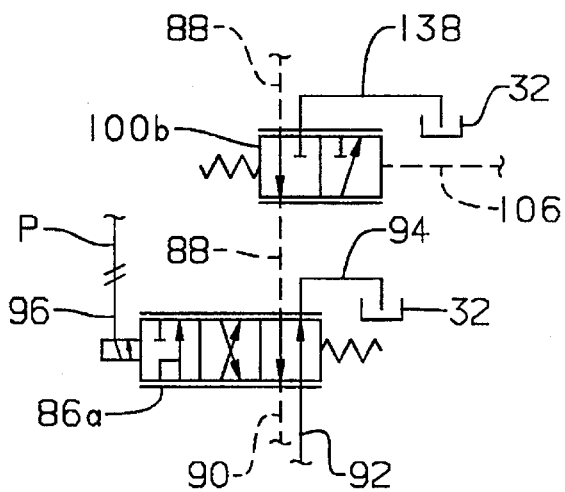
Fig_4_

CONTROL ARRANGEMENT FOR A HYDROSTATIC SYSTEM

TECHNICAL FIELD

This invention relates generally to the control of a hydrostatic system and, more specifically, to the apparatus for the control of a variable displacement hydraulic pump and a variable displacement hydraulic motor.

BACKGROUND OF THE INVENTION

It is well known in the art to control the displacement of both a variable displacement pump and a variable displacement motor by controlling a source of pressurized fluid being directed to the respective displacement controllers. In these known systems, the displacement controllers are controlled strictly by the pressure being directed thereto in response to operator movement of an input lever. When controlling the displacement controllers responsive to a pressure input only, some type of feedback apparatus is necessary to insure that the controller has moved to the desired displacement position as directed by the input signal. The addition of the needed feedback apparatus adds complications and cost to the system.

The present invention is directed to overcoming one or more of the problems as set forth above.

DISCLOSURE OF THE INVENTION

In one aspect of the present invention, a control arrangement is provided for use in a hydrostatic system having a power source drivingly connected to a variable displacement pump, a variable displacement motor fluidly connected to the variable displacement pump and operative to provide output power to a work system in response to a desired input command, and a source of pressurized pilot fluid. The variable displacement pump and motor each has a displacement controller thereon for controlling displacement thereof. The control arrangement includes a first speed sensor operative to produce an electrical signal representative of the input speed of the variable displacement pump and a second speed sensor operative to produce an electrical signal representative of the output speed of the variable displacement motor. A first solenoid operated proportional valve is provided and operative to selectively connect the source of pressurized pilot fluid to the displacement controller of the variable displacement pump to controllably change the displacement thereof. A second solenoid operated proportional valve is provided and operative to selectively connect the source of pressurized pilot fluid to the displacement controller of the variable displacement motor to controllably change the displacement thereof. A microprocessor is provided in the control arrangement and operative to receive the respective electrical signals from the first and second speed sensors, process the speed signals with respect to the desired input signal and known parameters, and transmit a first control signal to the first solenoid operated proportional valve to control the displacement of the variable displacement pump between a minimum and a maximum displacement. A second control signal is transmitted from the microprocessor to the second solenoid operated proportional valve to control the displacement of the variable displacement motor between a maximum displacement and a minimum displacement to obtain the desired output speed as established by the input command. The displacement of the variable displacement motor is reduced once the displacement of the variable displacement pump reaches its maximum displacement position.

The intent of the present invention is to provide a control arrangement that controls the displacement of the variable displacement pump and the displacement of the variable displacement motor in response to fluid flow as opposed to being pressure responsive. Consequently, special follow up mechanism such as servo valves are not needed thus reducing the complexity and cost of the system.

BRIEF DESCRIPTION OF THE DRAWINGS

FIG. 1 is a schematic representation of the hydrostatic system incorporating an embodiment of the present invention;

FIG. 2 is a schematic representation of a portion of the hydrostatic system of FIG. 1 incorporating another embodiment of the present invention;

FIG. 3 is a schematic representation of a portion of the hydrostatic system of FIG. 1 incorporating yet another embodiment of the subject invention; and FIG. 4 is a schematic representation of another portion of the hydrostatic system of FIG. 1 including a further embodiment of the present invention.

BEST MODE FOR CARRYING OUT THE INVENTION

Referring to FIG. 1, a hydrostatic system 10 is illustrated and includes a variable displacement pump 12 having a displacement controller 14 and a variable displacement motor 16 having a displacement controller 18. The variable displacement pump 12 is driven by a power source, such as an engine 20, through a pump input drive shaft 22. The variable displacement motor 16 is drivingly connected to the work system 24 through an output shaft 26. The work system 24 could be any type of an implement or a drive mechanism for a machine. The hydrostatic system 10 further includes a source of pressurized pilot fluid 30 that operatively receives fluid from a reservoir 32 and delivers pressurized fluid to make up lost fluid in the hydrostatic system 10 and also to provide a pressurized control fluid for the hydrostatic system.

The variable displacement motor 16 is fluidly connected, in a conventional manner, to the variable displacement pump 12 by respective conduits 34,36. A typical relief and make-up arrangement 38 is provided to control the pressure in the hydrostatic system 10 and to provide make-up fluid thereto to offset any leakage in the hydrostatic system 10. The relief and make-up arrangement 38 is connected to the hydrostatic system 10 by conduits 40,42. The conduit 40 is connected to the conduit 34 while the conduit 42 is connected to the conduit 36. The source of pressurized pilot fluid 30 is connected to the relief and make-up arrangement 38 by a pilot conduit 44. The pressurized pilot fluid is directed to the hydrostatic system 10 through respective one-way check valves 46,48. Typical pressure relief valves 50,52 are respectively connected to the conduits 40,42 and function to limit the maximum pressure in the respective conduits 34,36 of the hydrostatic system 10.

A control arrangement 56 is provided in the hydrostatic system 10 and operative to control the displacement of the variable displacement pump 12 and the displacement of the variable displacement motor 16. The control arrangement 56 includes a microprocessor 58 that receives various electrical signals from the system and processes the electrical signals with respect to various system parameters. An operator's input command "I" is directed to the microprocessor 58 through an electrical line 60 from an input controller 62. The input command "I" is representative of the work desired by the operator to be accomplished by the work system 24.

A first speed sensor 64 is operatively associated with the pump input drive shaft 22 to produce a speed signal "R" that is representative of the speed of the variable displacement pump 12. The signal "R" is delivered to the microprocessor 58 through an electrical line 66. A second speed sensor 68 is operatively associated with the output shaft 26 to produce an electrical signal "S" that is representative of the output speed of the variable displacement motor 16. The signal "S" is delivered to the microprocessor 58 through an electrical line 70.

The control arrangement 56 also includes a first solenoid operated proportional valve 86 that is operatively disposed between the source of pressurized pilot fluid 30 and the displacement controller 14 of the variable displacement pump 12. A pilot conduit 88 connects the source of pressurized pilot fluid 30 with the first solenoid operated proportional valve 86. Respective conduits 90, 92 connect the first solenoid operated proportional valve 86 with the displacement controller 14 of the variable displacement pump 12. A conduit 94 connects the first solenoid operated proportional valve 86 to the reservoir 32.

The first solenoid operated proportional valve 86 is spring biased to a first position at which the source of pressurized fluid 30 is connected to one end of the displacement controller 14 of the variable displacement pump 12 and the other end of the displacement controller 14 is in communication with the reservoir 32 through the conduit 94.

A first control signal "P" is generated by the microprocessor 58 and directed through an electrical line 96 to the first solenoid operated proportional valve 86. The electrical signal "P" is operable to move the valving element of the first solenoid operated proportional valve 86 against the bias of the spring therein to a second position at which fluid flow to and from the displacement controller 14 of the variable displacement pump 12 is blocked. The first solenoid operated proportional valve 86 is movable to another position at which the source of pressurized pilot fluid 30 is in communication with the other end of the displacement controller 14 of the variable displacement pump 12 and the one end thereof is in communication with the reservoir 32 through the conduits 92,94. The degree of movement of the displacement controller 14 in either direction is directly proportional to the magnitude of the first control signal "P".

A maximum pressure cutoff valve mechanism 100 is part of the control arrangement and is operatively disposed in the subject arrangement between the conduits 90 and 92. The maximum pressure cutoff valve mechanism 100 is spring biased to a first position at which fluid communication therethrough is blocked and movable to a second position at which the conduit 90 is in fluid communication with the conduit 92. The maximum pressure cutoff valve mechanism 100 is movable towards its second position in response to the highest pressure in the hydrostatic system 10. A resolver valve 102 is connected to the respective conduits 40,42 and the highest pressure signal in the hydrostatic system 10 is delivered through a conduit 104 and a conduit 106 to the maximum pressure cutoff valve mechanism 100. Once the highest pressure in the hydrostatic system 10 reaches a predetermined level, the maximum pressure cutoff valve 100 progressively opens to interconnect the conduits 90,92 so that the displacement of the variable displacement pump 12 is reduced to the level necessary to maintain the system at the given maximum pressure level and not allow the pressure level to exceed the maximum preset level.

The displacement controller 18 of the variable displacement motor 16 is spring biased to the maximum displacement position and movable toward the minimum displacement position in receipt of a pressure signal from the source of pressurized pilot fluid 30. A second solenoid operated proportional valve 108 is included in the control arrangement 56 and disposed between the source of pressurized pilot fluid 30 and the displacement controller 18 of the variable displacement motor 16. A conduit 110 connects the source of pressurized pilot fluid 30 with the second solenoid operated proportional valve 108 and a conduit 112 connects the second solenoid operated proportional valve 108 to one end of the displacement controller 18 while a conduit 114 connects the second solenoid operated proportional valve 108 to the reservoir 32.

The second solenoid operated proportional valve 108 is spring biased to a position at which the conduit 112 is in communication with the conduit 114 and movable towards a second position at which the conduit 112 is in fluid communication with the source of pressurized fluid 30 through the conduits 110,88. The second solenoid operated proportional valve 108 is movable toward the second position in response to a second control signal "M" that is being transmitted by the microprocessor 58 and delivered to the second solenoid operated proportional valve 108 through an electrical line 116. The second control signal "M" is operable to progressively move the second solenoid operated proportional valve 108 between its operative positions. The displacement of the variable displacement motor 16 is reduced in response to an increasing second control signal "M".

A solenoid operated valve 120 is connected to the highest pressure signal in the hydrostatic system 10 by a conduit 122 being connected to the conduit 104. The solenoid operated valve 120 is connected to the spring chamber of the displacement controller 18 by a conduit 124 and to the reservoir 32 by a conduit 126. The solenoid actuated valve 120 is spring biased to a position at which the conduit 122 is in communication with the spring chamber of the displacement controller 18 through the conduit 124 and movable to a second position at which the spring chamber of the displacement 18 is in fluid communication with the reservoir 32 through the conduit 124,126. The solenoid actuated valve 120 is movable to its second position in response to an electrical signal "H" received through an electrical line 128 from the microprocessor 58.

Referring to FIG. 2, another embodiment of the displacement controller 18 of the variable displacement motor 16 is illustrated along with another embodiment of the second solenoid operated proportional valve 108 and the solenoid actuated valve 120. All like elements have like element numbers. The modified displacement controller 18A of FIG. 2 includes an actuator piston 130 that is connected to the displacement adjusting mechanism within the variable displacement motor 16. The actuator piston 130 of the displacement controller 18A is spring biased to a maximum displacement position by a spring 132 disposed in a spring chamber 133. A slug 134 is slidably disposed in the displacement controller 18 on the end thereof adjacent the spring chamber 133. The conduit 124 connects the solenoid operated valve 120 with the slug 134. Pressurized fluid in the conduit 124 acting on the slug 134 creates a force that is operative in conjunction the spring 132 to bias the actuator piston 130 towards its maximum displacement position. The conduit 112 connects the modified second solenoid operated proportional valve 108A with the actuator piston 130 through a pressure chamber 135 on the end thereof opposite the spring chamber 133. A conduit 136 connects the spring chamber 133 with the modified second solenoid operated proportional valve 108A. The modified second solenoid operated proportional valve 108A is spring biased to a position at which the source of pilot operated pilot fluid 30 is connected through the conduit 110 and the conduit 136 to the spring chamber 133. The pressure chamber 135 is connected through the conduits 112 and 114 to the reservoir 32. The modified second solenoid operated proportional valve 108A is movable toward a second and a third position in response to the electrical signal "M" delivered from the microprocessor 58 through the electrical line 116. In the second position of the modified second solenoid operated proportional valve 108A, the conduits 112 and 136 are blocked from both the source of pressurized pilot fluid 30 and the reservoir 32. In the third position of the modified second solenoid operated proportional valve 108A, the source of pressurized pilot fluid 30 is in fluid communication with the pressure chamber 135 and the actuator piston 130 and the spring chamber 133 is in communication with the reservoir 32 through the conduits 136,114.

Referring to FIG. 3, a modified maximum pressure cutoff valve mechanism 100A is illustrated. The modified maximum pressure cutoff valve mechanism 100A is disposed in the conduits 90,92 between the first solenoid operated proportional valve 86 and the displacement controller 14 of the variable displacement pump 12. The modified maximum pressure cutoff valve mechanism 100A is spring biased to a position at which communication through the conduits 90,92 is open and movable towards a second position at which the conduits 90,92 are in fluid communication with the reservoir 32 through a conduit 138. The modified maximum pressure cutoff valve mechanism 100A is movable toward its second position in response to the highest pressure in the hydrostatic system 10 delivered through the conduits 104,106.

Referring to FIG. 4, another embodiment of controlling the maximum pressure cutoff point is illustrated. In the subject arrangement, a two position proportional valve 100B is disposed in the conduit 88 and a modified first solenoid operated proportional valve 86A is provided downstream thereof. The two position proportional valve 100B is spring biased to a position at which the source of pressurized pilot fluid 30 is communicated thereacross to the modified first solenoid operated proportional valve 86A. The two position proportional valve 100B is movable to a second position at which the source of pressurized fluid 30 is blocked and the pressurized fluid to the modified first solenoid actuator proportional valve 86A is communicated through the conduit 138 to the reservoir 32. The two position proportional valve 100B is movable toward the second position in response to the highest pressure signal in the hydrostatic system 10 as communicated through the conduit 106. The modified first solenoid operated proportional valve 86A is spring biased to the first position at which the conduit 88 is in fluid communication with the conduit 90 and the conduit 92 is in communication with the reservoir 32. The modified first solenoid operated proportional valve 86 is movable toward a second position at which the conduit 88 is in communication with the conduit 92 while the conduit 90 is in communication with the fluid reservoir 32 through the conduit 94 and a third position at which the conduit 88 is blocked and both of the conduits 90,92 are in fluid communication with the reservoir 32 through the conduit 94. The modified first solenoid operated proportional valve 86A is movable toward its second and third position in response to the electrical signal "P" delivered from the microprocessor 58 through the electrical line 96.

It is recognized that various forms of the subject hydrostatic system 10 could be utilized without departing from the essence of the invention. Various hydraulic valve arrangements could also be utilized to achieve the desired results.

Industrial Applicability

In the operation of a typical hydrostatic system, the variable displacement pump 12 is driven through the pump input shaft 22 by an engine 20 and the displacement controller 14 controls the volume of fluid being delivered therefrom. When the machine is not in motion, the displacement controller 14 is spring biased to a center position at which the variable displacement pump is not producing any flow therefrom. If the displacement controller 14 is moved to the left, as viewed in FIG. 1, pressurized fluid flow is delivered to the variable displacement motor 16 through the conduit 34 causing the variable displacement motor 16 to rotate in one direction and deliver power through the output shaft 26 to the work system 24. Fluid flow from the variable displacement motor 16 is transmitted through the conduit 36 back to the variable displacement pump 12 and the cycle continues. Upon movement of the displacement controller 14 in the opposite direction, pressurized fluid flow is delivered from the variable displacement pump through the conduit 36 to the variable displacement motor 16 resulting in the variable displacement motor 16 turning in the opposite direction to rotate the output shaft 26 in the opposite direction.

In the absence of any pressure signal in the conduit 112, the motor displacement controller 18 remains in its maximum displacement position. In this position, the maximum output torque of the variable displacement motor 16 is attained. Any movement of the displacement controller 18 of the variable displacement motor 16 toward the right, as viewed in FIG. 1, results in the displacement of the motor 16 being decreased which results in an increased output speed of the output shaft 26 for a predetermined volume of fluid being delivered through either of the conduits 34,36. In order to increase the speed of variable displacement motor 16 and subsequently the speed of the output shaft 26, the displacement of the variable displacement pump 12 is increased or the displacement of the variable displacement motor 16 is decreased.

As is well known in hydrostatic systems, any fluid losses are made up by pressurized pilot fluid being directed from the source of pressurized pilot fluid 30 through the conduit 44, the respective check valves 46,48 and the conduits 40,42 to the respective conduits 34,36 of the hydrostatic system 10. The make-up fluid can readily enter the low pressure side of the hydrostatic loop in order to insure that the hydrostatic loop is continually filled with fluid. Likewise, as is well known, any pressure levels in the conduits 34,36 that exceeds a predetermined level is relieved through the respective pressure relief valves 50,52 and into the respective low pressure side of the hydrostatic loop through the one way check valves 46,48.

In the subject arrangement, the speed of the input shaft 22 and the speed of the output shaft 68 are sensed and delivered to the microprocessor 58. When the operator makes an input to the input controller 62, the command signal "I" is delivered from the input controller 62 to the microprocessor 58 indicating the magnitude and amount of work to be performed by the work system 24. The microprocessor 58 compares the speed signals of the pump input drive shaft 22 and the motor output shaft 26 "R,S" with respect to the desired input signal "I" and known system parameters and transmits the first control signal "P" to the first solenoid operated proportional valve 86. Initially with no work being performed by the work system 24, the first solenoid operated proportional valve 86 is in the second position at which the displacement controller 14 thereof is spring biased to its center position at which the variable displacement pump 12 is not providing any fluid flow therefrom. The first control signal "P" conditions the first solenoid operated proportional valve 86 to move to one of its first or third positions which, in turn, directs pressurized fluid to one end of the displacement controller 14. As a result thereof, the variable displacement pump 12 directs pressurized fluid to the variable displacement motor 16 resulting in the output shaft 26 rotating to provide power to the work system 24. The speed of the output shaft 26 is sensed by the second speed sensor 68 and the signal "S" is delivered to the microprocessor 58 where it is compared to the signal "R" representative of the speed of the input shaft 22 and the input signal "I" from the input controller 62. Once the input command signal "I" is satisfied, the signal "P" to the first solenoid operated proportional valve 86 is maintained at a given level. This, in turn, maintains the displacement controller 14 in a given position to maintain the needed flow to the variable displacement motor 16 to sustain the required speed of the output shaft 26. If the speed of the output shaft 26 is turning too fast, the signal "P" is modified, thus resulting in the first solenoid operated proportional valve 86 changing position. The change in position of the first solenoid operated proportional valve 86 allows the displacement controller 14 to move back toward the center position which decreases the flow from the variable displacement pump 12 to the variable displacement motor 16. The reduced flow to the variable displacement motor 16 reduces the speed of the output shafts 26. As long as the input command signal "I" is not changed, the microprocessor 58 continues to modify the first control signal "P" to maintain the desired output speed of the output shaft 26.

When it is desired to rotate the output shaft 26 in the opposite direction at a predetermined speed, the signal "P" from the microprocessor 58 conditions the first solenoid operated proportional valve 86 to move the displacement controller 14 in the opposite direction. This directs pressurized fluid from the variable displacement pump 12 to the other side of the variable displacement motor 16 resulting in the output shaft 26 turning in the opposite direction. As previously described, the speed of the output shaft 26 is sensed and compared to the speed of the input shaft 22 and the input command signal "I". As a result, the first control signal "P" is adjusted accordingly to maintain a predetermined displacement of the variable displacement pump 12 through the displacement controller 14 resulting in a controlled output speed of the output shaft 26.

In the event that the input command signal "I" is requesting an output speed that is higher than can be achieved by the maximum displacement of the variable displacement pump 12, the displacement of the variable displacement motor 16 is thereafter decreased. Additionally, the first control signal "P" conditions the first solenoid operated proportional valve 86 to cause the displacement controller 14 of the variable displacement pump 12 to move to its maximum displacement position. At the maximum displacement position of the displacement controller 14, the maximum flow output to the motor 16 is achieved. This maximum output flow from the variable displacement pump 12 to the variable displacement motor 16 results in the output shaft 26 turning at the highest speed possible from the maximum displacement of the variable displacement motor 16. The maximum displacement position of the variable displacement pump 12, in the subject arrangement, is sensed by the displacement sensor 76 and the displacement signal "D" is delivered to the microprocessor 58. It is recognized that the maximum displacement position of the variable displacement pump 12 may be detected in other ways, such as, if a higher speed of the output shaft 26 is desired and the speed thereof does not increase beyond a certain speed for a predetermined time period, the microprocessor senses the time lapse and begins to change the displacement of the variable displacement motor 16. If the variable displacement pump 12 did not have a displacement sensor 76, the microprocessor could detect that the pump had reached its maximum displacement position when the speed of the output shaft 26 does not continue to increase over a short period of time. In either condition, the microprocessor maintains the signal "P" which is conditioning the first solenoid operated proportional valve 86 to maintain the variable displacement pump 12 in its maximum displacement position. Simultaneously therewith a second control signal "M" is delivered to the second solenoid operated proportional valve 108 which conditions the second solenoid operated proportional valve 108 to direct pressurized fluid from the source of pressurized pilot fluid 30 to the displacement controller 18. The pressurized pilot fluid acting on the controller 18 results in the displacement controller 18 decreasing the displacement of the motor 16 which, as previously stated, results in the output shaft 26 increasing in speed. As previously noted, the second speed sensor 68 monitors the speed of the output shaft 26 and delivers the signal "S" representative thereof to the microprocessor 58. Once the desired output speed of the output shaft 26 is achieved, as required by the input command "I" from the input controller 62, the second control signal "M" is adjusted accordingly to maintain the second solenoid operated proportional valve 108 in a position which maintains the displacement controller 18 in the respective position which controls the speed of the output shaft 26 to the level required by the input command "I". If the speed of the output shaft 26 is turning faster than that required by the input command "I", the signal "M" is adjusted to cause the second solenoid operated proportional valve 108 to decrease the signal to the displacement controller 18. This results in the displacement of the variable displacement motor 16 increasing which results in the speed of the output shaft decreasing. Once the proper speed of the output shaft is achieved, the second control signal "M" is maintained, thus maintaining the output speed 26 at a desired level, as required by the input command "I".

In the subject arrangement, when the displacement controller 14 of the variable displacement pump 12 is being controlled between its minimum and maximum positions in either direction, the displacement controller 18 of the variable displacement motor 16 is maintained in its maximum displacement position. In order to insure that the displacement controller 18 thereof is maintained in its maximum displacement position, the highest pressure from the conduits 34,36 of the hydrostatic loop is directed through the resolver 102, conduits 104,122, across the solenoid operated proportional valve 120, and the conduit 124 to the spring chamber of the displacement controller 18. Therefore, during control of the displacement of the variable displacement pump 12, the displacement controller 18 of the variable displacement motor 16 is held in its maximum displacement position, not only by the spring therein, but also by the pressurized fluid being directed thereto from the hydrostatic loop. Once the variable displacement pump 12 reaches its maximum displacement position and more output speed of the output shaft 26 is desired, the microprocessor 58 directs the control signal "H" to the solenoid actuated valve 120 moving it to its second operative position. In the second position thereof, the conduit 124 is in communication with the reservoir 32 and the conduit 122 is blocked therefrom. Once the solenoid operated valve 120 is moved to its second position, the microprocessor 58 proceeds with providing the second control signal "M" to the second solenoid operated proportional valve 108 to move the displacement controller 18 of the variable displacement motor 16 toward its minimum displacement position. In this arrangement, the displacement of the variable displacement motor 16 is not varied until the displacement of the variable displacement pump 12 has been changed to its maximum displacement position. Consequently, the speed of the output shaft 26 can be continuously varied from zero speed to its maximum speed capability.

During operation of the system, if the maximum pressure in the conduits 34,36 of the hydrostatic loop increases beyond the predetermined level, the higher pressure signal therefrom is directed through the resolver 102, the conduit 104,106 to the maximum pressure cutoff valve mechanism 100 moving it toward its second position to progressively interconnect the conduits 90,92. Interconnection of the conduits 90,92 permits the centering springs in the displacement controller 14 to reduce the displacement of the variable displacement pump 12, thus reducing the pressure level in the conduits 34,36 of the hydrostatic system. The pressure level needed to move the maximum pressure cutoff valve mechanism 100 to its second position is slightly lower than the pressure necessary to open the respective pressure relief valves 50,52. Consequently, system horsepower is conserved due to the fact that the maximum pressure cutoff valve 100 results in the flow from the variable displacement pump 12 being reduced. Otherwise, the flow being produced would be directed across the pressure relief valve 50,52 at a pressure level which detrimentally uses extra horsepower from the engine 20.

Referring to the operation of FIG. 2, the modified displacement controller 18A is illustrated along with an associated modified second solenoid operated proportional valve 108A and the solenoid operated valve 120. The modified displacement controller 18A is operative to adjust the displacement of the variable displacement motor 16 from its maximum displacement to its minimum displacement. The actuator piston 130 is spring biased by the spring 132 to the position maintaining the variable displacement motor 16 in its maximum displacement position. During operation, the modified second solenoid operated proportional valve 108A is in its first position wherein fluid from the source of pressurized pilot fluid 30 is directed to the spring chamber 133 of the modified displacement controller 18A and acts in conjunction with the spring 132 to maintain the actuator piston 130 in the position illustrated. Simultaneously, the highest pressure signal in the hydrostatic loop that is in the conduit 122 is directed across the solenoid operated valve 120 through the conduit 124 and acts on the slug 134 to further secure the actuator piston 130 in the position to maintain the variable displacement motor 16 at its maximum displacement position. When it is desired to decrease the volume of the variable displacement motor 16, the electrical signal "H" is directed through the electrical line 128 to the solenoid operated valve 120 moving it to its second operative position to vent the pressurized fluid in the conduit 124. Simultaneously therewith or subsequent thereto, the electrical signal "M" is directed through the electrical line 116 to the modified second solenoid operated proportional valve 108A moving it toward its third position wherein the pressurized fluid in the conduit 110 is directed to the pressure chamber 135. The pressure in the pressure chamber 135 urges the actuator piston 130 from its illustrated position which decreases the displacement of the variable displacement motor 16. Once the displacement of the variable displacement motor 16 reaches the desired displacement, the electrical signal "M" is modified to move the modified second solenoid operated proportional valve 108A towards its second position, thus maintaining the actuator piston 130 in the predetermined location to maintain the desired displacement of the variable displacement motor 16. If the speed of the output shaft 26 is to high, the electrical signal "M" is modified to move the modified second solenoid operated proportional valve 108A towards its first position to increase the displacement of the variable displacement motor 16. It is recognized that due to internal leakage, the modified second solenoid operated proportional valve 108A may need to be continuously adjusted in order to maintain the desired speed of the output shaft 26. The arrangement illustrated in FIG. 2 further insures that the displacement of the motor is maintained in its maximum displacement position when the displacement of the variable displacement pump 12 is being varied between its minimum and maximum positions.

Referring to the operation of FIG. 3, the modified maximum pressure cutoff valve mechanism 100A functions like the modified pressure cutoff valve mechanism 100 of FIG. 1 to decrease the displacement of the variable displacement pump 12 in the event the pressure in either of the conduits 34,36 of the hydrostatic loop exceeds a maximum predetermined pressure level. In the subject arrangement of FIG. 3, the modified maximum pressure cutoff valve mechanism 100A progressively interrupts the fluid flow through the conduits 90,92 to the displacement controller 14 in response to the highest pressure signal in the conduits 34,36 of the hydrostatic loop. As the fluid flow through the conduits 90,92 is being interrupted, the fluid in the displacement controller 14 is progressively vented to the reservoir 32 through the conduit 138. The modified maximum pressure cutoff valve mechanism 100A is movable between the wide open position and the full bypass position to insure that the maximum pressure in the hydrostatic system 10 does not exceed the predetermined maximum level.

Referring to the operation of FIG. 4, another embodiment of the maximum pressure cutoff valve mechanism 100 is illustrated. In this arrangement, the maximum pressure cutoff valve mechanism 100B is disposed in the conduit 88 and is operative to progressively interrupt the flow from the source of pressurized pilot fluid 30 in response to the highest pressure signal in the conduits 34,36 of the hydrostatic loop exceeding a predetermined level as sensed through the conduit 106. In the subject arrangement, the maximum pressure cutoff valve mechanism 100B is located upstream of the modified first solenoid operated proportional valve 86A. The modified first solenoid operated proportional valve 86A functions like the first solenoid operated proportional valve 86 of FIG. 1 to progressively change the displacement of the variable displacement pump 12 between its minimum and maximum positions in either direction responsive to the control signal "P" directed through the electrical line 96.

In view of the foregoing, it is readily apparent that the control arrangement for a hydrostatic system 10 provides an arrangement that effectively controls the displacement of a variable displacement pump 12 and the displacement of a variable displacement motor 16 in the hydrostatic system in response to the flow in the hydrostatic loop to provide a desired output to a work system without requiring the need of complicated feedback mechanisms and/or follow-up servos.

Other aspects, objects and advantages of the invention can be obtained from a study of the drawings, the disclosure and the appended claims.

We claim:

1. A control arrangement for a hydrostatic system having a power source drivingly connected to a variable displacement pump, a variable displacement motor fluidly connected to the variable displacement pump and operative to provide output power to a work system in response to a desired input command, and a source of pressurized pilot fluid, the variable displacement pump and motor each has a displacement controller thereon, the control arrangement comprising:

a first speed sensor operative to produce an electrical signal representative of the input speed of the variable displacement pump;

a second speed sensor operative to produce an electrical signal representative of the output speed of the variable displacement motor;

a first solenoid operated proportional valve operative to selectively connect the source of pressurized pilot fluid to the displacement controller of the variable displacement pump to controllably change the displacement thereof;

a second solenoid operated proportional valve operative to selectively connect the source of pressurized pilot fluid to the displacement controller of the variable displacement motor to controllably change the displacement thereof;

a microprocessor operative to receive the respective electrical signals from the first and second speed sensors, process the speed signals with respect to the desired input signal and known parameters, and transmit a first control signal to the first solenoid operated proportional valve to control the displacement of the variable displacement pump between a minimum and a maximum displacement and a second control signal to the second solenoid operated proportional valve to control the displacement of the variable displacement motor between a maximum displacement and a minimum displacement to obtain the desired output speed as established by the input command, the displacement of the variable displacement motor is reduced once the displacement of the variable displacement pump reaches its maximum displacement position; and a valve mechanism which, in use, selectively directs system pressure to the displacement controller of the variable displacement motor to positively maintain the variable displacement motor in its maximum displacement position during the time that the displacement of the variable displacement pump is being controlled between its minimum and maximum displacement positions.

2. The control arrangement of claim 1 wherein the valve mechanism is a solenoid operated valve mechanism that is spring biased to a position connecting the system pressure to the motor displacement controller and movable in response to an electrical signal (H) from the microprocessor to a position blocking the system pressure thereacross.

3. The control arrangement of claim 2 including a maximum pressure cutoff valve that is disposed between the source of pressurized pilot fluid and the displacement controller of the variable displacement pump and operative to limit a maximum system pressure to a predetermined level by controllably reducing the displacement of the variable displacement pump in response to the system pressure reaching the predetermined level.

4. The control arrangement of claim 3 wherein the maximum pressure cutoff valve is disposed between the source of pressurized pilot fluid and the first solenoid operated proportional valve.

5. The control arrangement of claim 3 wherein the maximum pressure cutoff valve is disposed between the first solenoid operated proportional valve and the displacement controller of the variable displacement pump.

* * * * *